US012610414B2

(12) United States Patent
Subramanian et al.

(10) Patent No.: US 12,610,414 B2
(45) Date of Patent: Apr. 21, 2026

(54) INTELLIGENT TRANSMISSION PORT SELECTION AND POWER UTILIZATION FOR A CELLULAR DEVICE

(71) Applicant: Apple Inc., Cupertino, CA (US)

(72) Inventors: Sriram Subramanian, San Jose, CA (US); Alosious Pradeep Prabhakar, Singapore (SG); Madhukar K. Shanbhag, Santa Clara, CA (US); Pengkai Zhao, Cupertino, CA (US); Sanjeevi Balasubramanian, San Jose, CA (US); Shiva Krishna Narra, Dublin, CA (US); Vijay Venkataraman, San Jose, CA (US); Vishwanth Kamala Govindaraju, Mountain View, CA (US); Wenping Lou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 28 days.

(21) Appl. No.: 18/455,044

(22) Filed: Aug. 24, 2023

(65) Prior Publication Data

US 2023/0403754 A1     Dec. 14, 2023

Related U.S. Application Data

(63) Continuation of application No. 17/304,418, filed on Jun. 21, 2021, now Pat. No. 11,758,602.

(60) Provisional application No. 63/040,920, filed on Jun. 18, 2020.

(51) Int. Cl.
*H04W 76/15* (2018.01)
*H04W 28/02* (2009.01)
*H04W 72/21* (2023.01)
*H04W 72/56* (2023.01)

(52) U.S. Cl.
CPC ....... *H04W 76/15* (2018.02); *H04W 28/0268* (2013.01); *H04W 28/0278* (2013.01); *H04W 72/21* (2023.01); *H04W 72/56* (2023.01)

(58) Field of Classification Search
None
See application file for complete search history.

(56) References Cited

U.S. PATENT DOCUMENTS

| | | | | |
|---|---|---|---|---|
| 2019/0268950 | A1 * | 8/2019 | Youtz | H04W 76/30 |
| 2020/0344630 | A1 * | 10/2020 | Jha | H04W 24/10 |
| 2020/0351771 | A1 * | 11/2020 | Geekie | H04W 76/30 |

* cited by examiner

*Primary Examiner* — Kouroush Mohebbi
(74) *Attorney, Agent, or Firm* — Fay Kaplun & Marcin, LLP

(57) ABSTRACT

A user equipment (UE) is configured to establish network connections for long-term evolution (LTE) and new radio (NR) radio access technologies (RATs) in non-standalone (NSA) E-UTRA-NR dual connectivity (ENDC) operation. The UE includes a multi-antenna array for data and signaling transmissions and receptions over the LTE and NR connections. The UE determines a most efficient antenna of the multi-antenna array for an operating frequency band of the LTE and NR connections, wherein the most efficient antenna is determined based on at least one performance factor for the UE when using the antenna compared to other antennas of the multi-antenna array, evaluates one or more factors for determining whether the LTE RAT or the NR RAT is to use the most efficient antenna and transmits uplink data on the most efficient antenna via either the LTE RAT or the NR RAT based on the evaluated factors.

15 Claims, 4 Drawing Sheets

Method 500

Method 300

Start

UE determines which antenna of a multi-antenna array is most efficient for an operating frequency band of LTE and NR connections — 305

UE evaluates one or more factors for determining which RAT may use most efficient antenna for a data transmission — 310

UE transmits data via most efficient antenna based on factor evaluations — 315

End

400

| Bearer | Priority | |
|---|---|---|
| LTE Only - Signaling | 1 | |
| LTE Only - Default | 2 | |
| LTE Only - Voice | 1 | |
| LTE + NR | 2 | Reduce data from AP; push data traffic via LTE |
| NR Only | 3 | |

Method 500

INTELLIGENT TRANSMISSION PORT SELECTION AND POWER UTILIZATION FOR A CELLULAR DEVICE

PRIORITY/INCORPORATION BY REFERENCE

This application claims priority to U.S. Provisional Patent Application Ser. No. 63/040,920 filed on Jun. 18, 2020 and entitled, "Intelligent Tx Port Selection and Power Utilization for NSA," the entirety of which is incorporated by reference herein.

BACKGROUND

Long-term evolution (LTE) and 5G New Radio (NR) are independent radio access technologies (RATs) which share the same antenna subsystems for transmission and reception of data and signaling. In some user equipment (UE) configurations, such as when the UE is operating in non-standalone (NSA) mode for 5G, the UE may establish a connection with both the 5G NR RAT and the LTE RAT simultaneously using E-UTRA-NR Dual Connectivity (ENDC) operation. However, the frequency bands used for LTE and NR (FR1) are overlapping, and the same antenna cannot be used for transmission/reception over both networks at the same time because of the potential for interference when neighboring frequencies are used.

SUMMARY

Some exemplary embodiments are related to a processor of a user equipment (UE) having network connections for long-term evolution (LTE) and new radio (NR) radio access technologies (RATs) in non-standalone (NSA) E-UTRA-NR dual connectivity (ENDC) operation, the UE including a multi-antenna array for data and signaling transmissions and receptions over the LTE and NR connections, wherein the processor is configured to perform operations. Then operations include determining a most efficient antenna of the multi-antenna array for an operating frequency band of the LTE and NR connections, wherein the most efficient antenna is determined based on at least one performance factor for the UE when using the antenna compared to other antennas of the multi-antenna array, evaluating one or more factors for determining whether the LTE RAT or the NR RAT is to use the most efficient antenna and transmitting uplink data on the most efficient antenna via either the LTE RAT or the NR RAT based on the evaluated factors.

Other exemplary embodiment are related to a processor of a user equipment (UE) having network connections for long-term evolution (LTE) and new radio (NR) radio access technologies (RATs) in non-standalone (NSA) E-UTRA-NR dual connectivity (ENDC) operation, wherein the processor is configured to perform operations. The operations include determining a trigger condition is present at the UE that requires a transmit (Tx) power reduction for either one or both of the LTE connection and the NR connection and implementing a power optimization based on the presence of the trigger condition.

Still further exemplary embodiments are related to a user equipment (UE) having a multi-antenna array for data and signaling transmissions and receptions with long-term evolution (LTE) and new radio (NR) networks and a transceiver communicatively coupled to the multi-antenna array and configured to establish network connections for the LTE and NR radio access technologies (RATs) in non-standalone (NSA) E-UTRA-NR dual connectivity (ENDC) operation.

The UE also includes a processor communicatively coupled to the transceiver and configured to perform operations. The operations include determining a most efficient antenna of the multi-antenna array for an operating frequency band of the LTE and NR connections, wherein the most efficient antenna is determined based on at least one performance factor for the UE when using the antenna compared to other antennas of the multi-antenna array, evaluating one or more factors for determining whether the LTE RAT or the NR RAT is to use the most efficient antenna and transmitting uplink data on the most efficient antenna via either the LTE RAT or the NR RAT based on the evaluated factors.

Additional exemplary embodiments are related to a user equipment (UE) having a transceiver configured to establish network connections for long-term evolution (LTE) and new radio (NR) radio access technologies (RATs) in non-standalone (NSA) E-UTRA-NR dual connectivity (ENDC) operation and a processor configured to perform operations. The operations include determining a trigger condition is present at the UE that requires a transmit (Tx) power reduction for either one or both of the LTE connection and the NR connection and implementing a power optimization based on the presence of the trigger condition.

DETAILED DESCRIPTION

Figure 1:
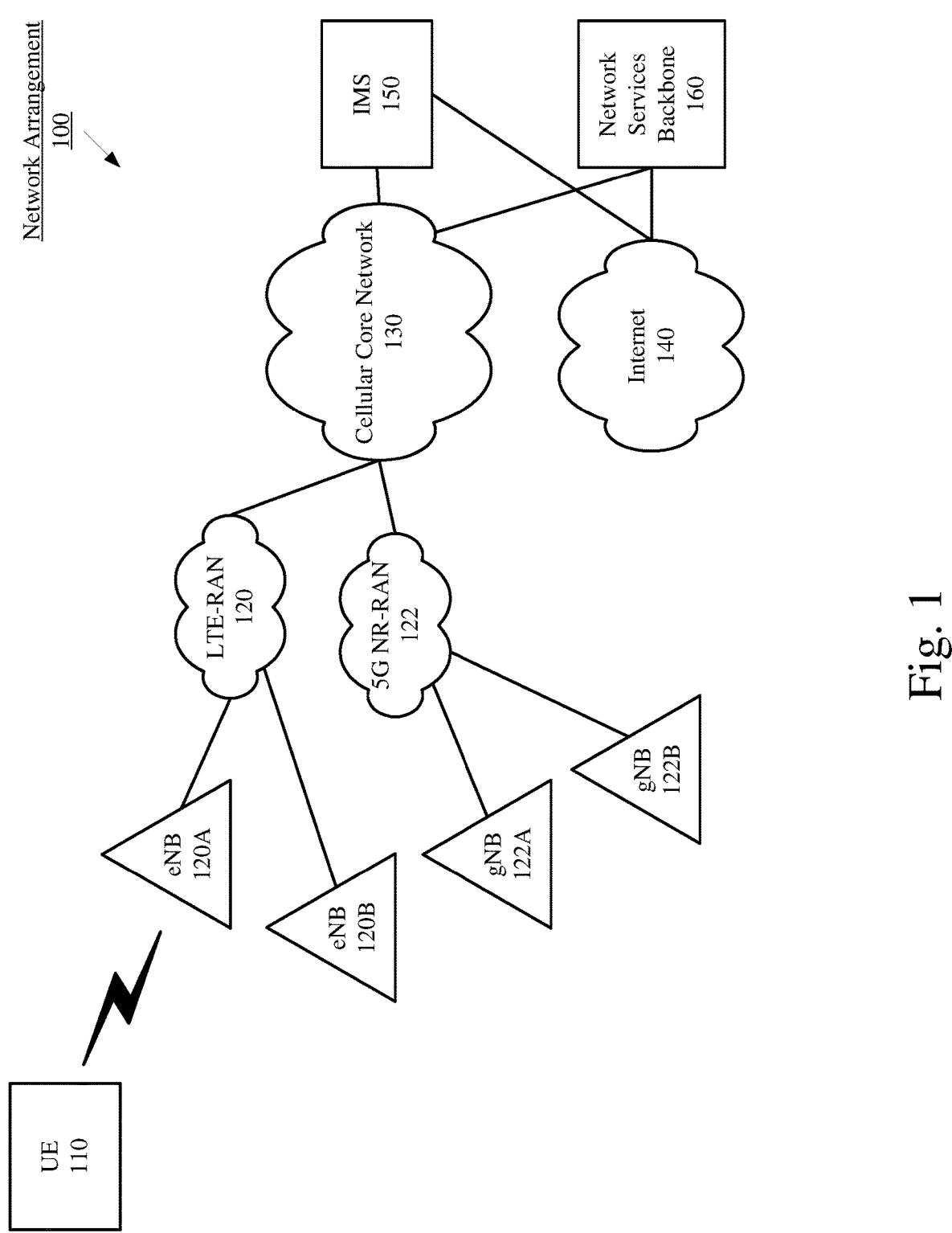
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe a device, system, and method for selecting an antenna and/or utilizing an antenna arrangement for transmissions over LTE and NR (FR1) for a user equipment (UE) in non-standalone (NSA) operation.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a network that includes 5G new radio (NR) radio access technology (RAT) and Long-Term Evolution (LTE) RAT. The network may support carrier aggregation (CA) and/or LTE-NR dual-connectivity (ENDC). CA and ENDC will be described below. However, both CA and ENDC relate to the UE being configured with a plurality of component carriers (CCs). Each CC may represent a channel that facilitates communication between the UE and the network over a particular frequency band. A plurality of CCs may correspond to the same frequency band, each CC may correspond to a different band or a combination thereof. Further, each CC has a particular bandwidth, and the more CCs the UE is configured with, the more bandwidth that is available for communications with the network.

The UE may be configured to access 5G NR services when operating in non-standalone (NSA) mode for 5G or standalone (SA) mode for 5G. In NSA mode, the UE may establish a connection with both 5G NR RAT and LTE RAT using E-UTRA-NR Dual Connectivity (ENDC). Throughout this description, ENDC may generally refer to a UE that is configured to transmit and receive on a plurality of CCs corresponding to cells associated with different RATs. For example, when in NSA mode for 5G, the UE may achieve ENDC via a master cell group (MCG) corresponding to LTE and a secondary cell group (SCG) corresponding to 5G NR or vice versa. Each cell group may include at least one cell for a corresponding RAT. In one exemplary scenario of ENDC, from a protocol stack perspective, the UE may have a control plane and a user plane with the 5G NR network while also having a control plane and a user plane with the LTE network. In another exemplary scenario of ENDC, the UE may have a control plane with the LTE network and a user plane with the 5G NR network or vice versa. Thus, when operating in NSA mode for 5G, the UE may have a simultaneous connection to 5G NR and LTE (e.g., ENDC). However, it should be noted, that when operating in NSA mode for 5G, the UE may transition between instances of being connected on one RAT (e.g., 5G NR, LTE, Legacy, etc.) to being connected on a multiple RATs (e.g., ENDC).

The following examples provide a general overview of the type of network configuration that may facilitate ENDC functionality. In a first exemplary configuration, the network connection may use the evolved packet core (EPC) of LTE and the UE may communicate with at least one LTE cell serving as the master cell group (MCG) and at least one NR cell serving as a secondary cell group (SCG). In a second exemplary configuration, the network connection may use the 5G core network (5GC) and the UE may communicate with at least one NR cell serving as the MCG and at least one LTE cell serving as the SCG. In a third exemplary NSA configuration, the network connection may use the 5GC and the UE may communicate with at least one LTE cell serving as the MCG and at least one NR cell serving as the SCG. However, the exemplary embodiments are not limited to the examples provided above related to either the protocol stack or the network configuration. The exemplary embodiments may apply to ENDC functionality being achieved in any appropriate manner.

In stand-alone (SA) mode for 5G, the UE may connect to one RAT at a particular time. Accordingly, the network connection may transition between different RATs (e.g., 5G NR, LTE, Legacy, etc.). For example, at a first time, the network connection may use the 5GC and the UE may communicate with the network via at least one NR cell. During operation, the UE may experience a handover from the 5G to LTE, where the network connection may then use the EPC and the UE may communicate with the LTE network via at least one LTE cell. However, any reference to a particular type of RAT, core network, cell or mode of operation is merely provided for illustrative purposes.

As mentioned above, the UE may also be configured with carrier aggregation (CA) functionality. The CA functionality may comprise a primary serving cell (PCell) providing a primary component carrier (PCC) and at least one secondary serving cell (SCell) providing a secondary component carrier (SCC) that correspond to the same RAT being used to facilitate communication with the network. The PCC may be used, in part, for control information such as scheduling requests, uplink grants, downlink grants, etc. CA functionality enables the PCC and at least one SCC to combine bandwidths to exchange data with the UE. Thus, with CA, the PCC may provide a first portion of a total bandwidth for data to be exchanged while the SCC may provide a second portion of the total bandwidth. The combination of a PCC and a single SCC may be characterized as a CC combination that includes two carriers. To further increase the total available bandwidth for data to be exchanged with the UE, additional SCCs may be incorporated. For example, with CA for LTE, there may be CC combinations that include, but are not limited to, two carriers, four carriers, five carriers, eight carriers, ten carriers, thirty-two carriers, etc. With CA for 5G NR there may be CC combinations that include, but are not limited to, two carriers, five carriers, ten carriers, twelve carriers, sixteen carriers, twenty carriers, twenty-five carriers, thirty-two carriers, sixty-four carriers, etc.

In ENDC operation, an MCG bearer, an SCG bearer and a split bearer (MCG/SCG split) may be established. An MCG bearer terminates at the master node, which may be an eNB for LTE, and an SCG bearer terminates at the secondary node, which may be a gNB for NR. A split bearer is a bearer for which traffic is routed via an LTE and/or an NR bearer. For an MCG split, traffic is split at the master node, while for an SCG split, traffic is split at the secondary node. With a split bearer, a portion of uplink data is transmitted via the master node and another portion of uplink data is transmitted via the secondary node. The data split is done at the packet data convergence protocol (PDCP) layer. If the uplink data buffer for the UE is filled to a value less than a split threshold, then data may be transmitted only to the master node, while if the buffer is filled to a value at or greater than the split threshold, then the data may be split and transmitted in portions to both the master node and the secondary node.

LTE and 5G NR are independent RATs which share the same antenna subsystems on a UE for transmission and reception of data and signaling over the respective networks. However, the frequency bands used for LTE and NR (FR1) overlap, and the same antenna cannot be used for transmission/reception over both networks at the same time because of the potential for interference when neighboring frequencies are used.

In some examples, a user equipment (UE) may be configured with four antennas for data transmissions/receptions and/or signaling using cellular technologies. However, it should be understood that the exemplary embodiments may apply to any multi-antenna arrangement. All of the antennas may support transmissions over low, mid, and high band frequencies. The UE efficiency may differ for each antenna. For example, a first antenna may have a higher efficiency for low band frequencies and marginal efficiency for mid and high frequency bands when the UE is tuned to a low band.

During ENDC operation, a UE may be scheduled for downlink data and uplink data at the same time. For example, the UE may have a PCell and SCells on LTE as a primary cell group (PCG) and add a SPCell and SCells on NR as a secondary cell group (SCG). The UE may choose the best antennas for these multiple carriers on co-existing RATs (LTE and NR). If the MCG and SCG are on different bands (LB or HB) the UE may compromise on either the data rate or the signaling quality. Because of the importance of the signaling link, the UE generally selects a better signaling link (LTE) rather than a higher data rate (FR1 NR).

Throughout this description, it will be described that the UE will select the best or most efficient antenna to transmit signals via one of the RATs (e.g., NR or LTE). It should be understood that best or most efficient are relative terms that may be defined in various manners. For example, one manner of determining the best antenna for a particular RAT may be to determine which antenna provides the highest link budget on the RAT. The antenna with the highest link budget will typically have a high data throughput and/or a higher quality link with the RAT. However, there may be other examples of performance factors that may be used to determine the best or most efficient antenna. Thus, the use of these terms should be understood to mean selecting an antenna based on any of one or more performance factors of the UE when using the antenna compared to other antennas of the multi-antenna array.

Network/Devices

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a LTE radio access network (LTE-RAN) 120 and a 5G New Radio (NR) radio access network (5G NR-RAN) 122. However, it should be understood that the UE 110 may also communicate with other types of networks (e.g. legacy cellular network, WLAN, etc.) and the UE 110 may also communicate with networks over a wired connection. With regard to the exemplary embodiments, the UE 110 may establish a connection with the 5G NR-RAN 122 and/or the LTE-RAN 120. Therefore, the UE 110 may have both a LTE chipset to communicate with the LTE-RAN 120 and a 5G NR chipset to communicate with the 5G NR-RAN 122.

The LTE-RAN 120 and the 5G NR-RAN 122 may be portions of cellular networks that may be deployed by cellular providers (e.g., Verizon, AT&T, T-Mobile, etc.). These networks 120 and 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The use of a separate LTE-RAN 120 and a 5G NR-RAN 122 is merely provided for illustrative purposes. An actual network arrangement may include a radio access network that includes architecture that is capable of providing both 5G NR RAT and LTE RAT services. For example, a next-generations radio access network (NG-RAN) (not pictured) may include a next generation Node B (gNB) that provides 5G NR services and a next generation evolved Node B (ng-eNB) that provides LTE services. The NG-RAN may be connected to at least one of the evolved packet core (EPC) or the 5G core (5GC). Thus, in one exemplary configuration, the UE 110 may achieve ENDC by establishing a connection to at least one cell corresponding to the LTE-RAN 120 and at least one cell corresponding to the 5G NR-RAN 122. In another exemplary configuration, the UE 110 may achieve ENDC by establishing a connection to at least two cells corresponding to the NG-RAN or other type of similar RAN. Accordingly, the example of a separate LTE-RAN 120 and a 5G NR-RAN 122 is merely provided for illustrative purposes.

Returning to the exemplary network arrangement 100, the UE 110 may connect to the LTE-RAN 120 via at least one of the evolved Node B (eNB) 120A or the eNB 120B. The UE 110 may connect to the 5G NR-RAN 122 via at least one of the next generation Node B (gNB) 122A or gNB 122B. Those skilled in the art will understand that any association procedure may be performed for the UE 110 to connect to the LTE-RAN 120 or the 5G NR-RAN 122. For example, as discussed above, the 5G NR-RAN 122 may be associated with a particular cellular provider where the UE 110 and/or the user thereof has a contract and credential information (e.g., stored on a SIM card). Upon detecting the presence of the 5G NR-RAN 122, the UE 110 may transmit the corresponding credential information to associate with the 5G NR-RAN 122. More specifically, the UE 110 may associate with a specific cell (e.g., the gNB 122A of the 5G NR-RAN 122). Similarly, for access to LTE services, the UE 110 may associate with eNB 120A. However, as mentioned above, the use of the LTE-RAN 120 and the 5G NR-RAN 122 is for illustrative purposes and any appropriate type of RAN may be used.

In addition to the RANs 120 and 122, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the EPC and/or the 5GC. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
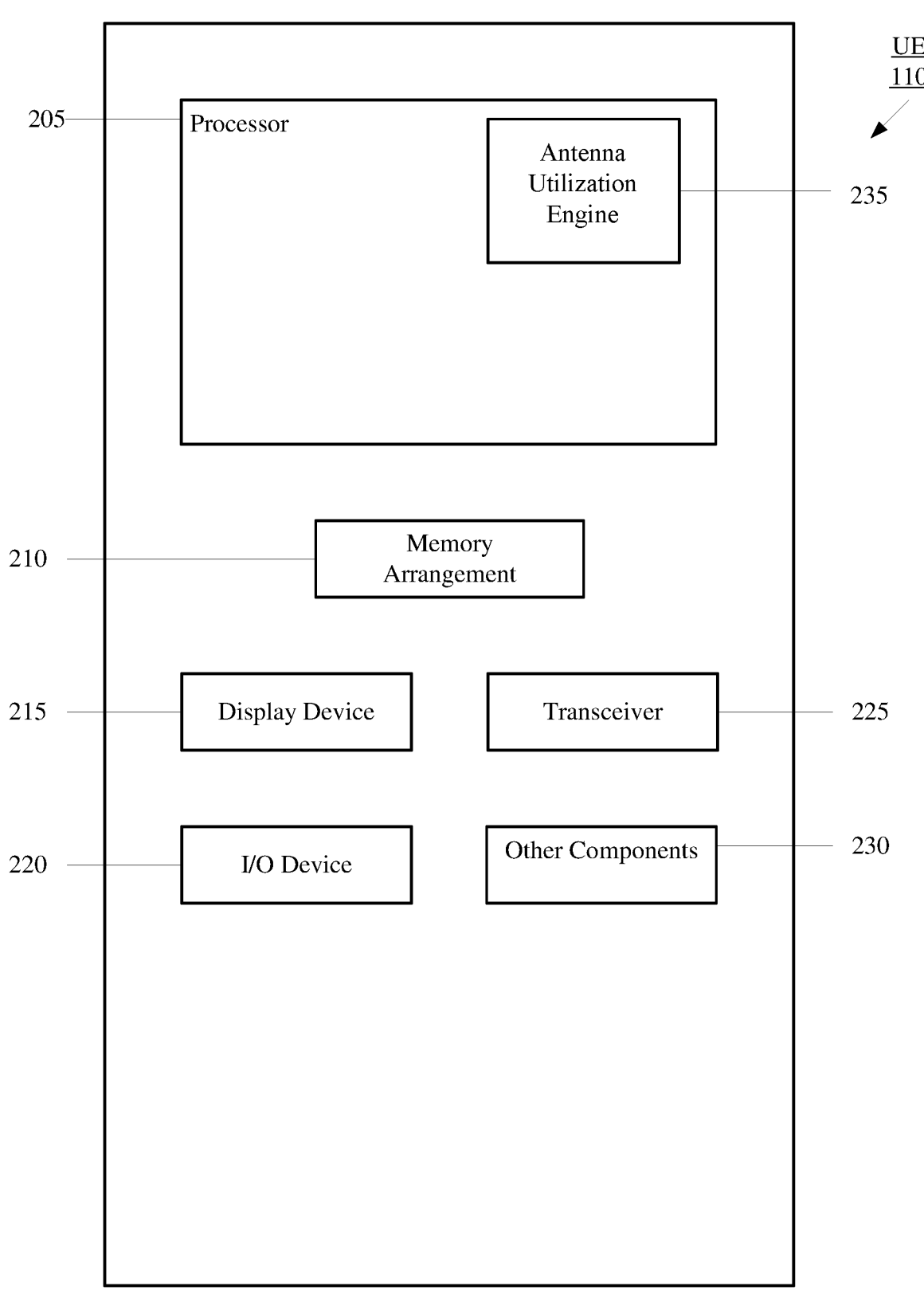
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include an antenna utilization engine 235. The antenna utilization engine 235 may perform operations including selecting an antenna for use in transmissions over LTE or NR in ENDC operation. The antenna utilization engine 235 may also implement Tx power optimization scheme for the UE so that the UE meets regulatory requirements during the ENDC operation.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE-RAN 120, the 5G NR-RAN 122 etc. Accordingly, the transceiver 225 may operate on a variety of different frequencies or channels (e.g., set of consecutive frequencies).

Higher Layer Parameter-Based Dynamic Tx Port Selection

According to some exemplary embodiments, a UE may implement a smart transmit (Tx) antenna selection for ENDC scenarios. The Tx antenna selection is dynamic, with the LTE and NR subsystems independently evaluating which Tx antenna should be used for a given transmission and the application processor (AP) deciding which RAT is allowed to use the best antenna based on, for example, the factors listed below. The assessment of the factors may be performed on a dynamic basis.

A first factor for the UE to evaluate is whether an NR data split threshold is higher than an LTE data split threshold. When the SCG cell is added for the UE, the UE may be provided an information element (IE) "ul-SplitThreshold−x bytes" establishing the data split threshold for the SCG. In this example, the SCG is provided via NR. When the NR threshold is higher than the LTE threshold, the NR subsystem may use the best (e.g., most efficient) Tx antenna to send the data on the Physical Uplink Shared Channel (PUSCH). For example, the UE may send a buffer status report (BSR) and/or a scheduling request (SR) for the SCG on the best antenna and then transmit PUSCH data on the best antenna after receiving the UL grant(s).

A second factor for the UE to evaluate is whether high priority data is pending for transmission. For example, when the SCG is added via an LTE RRC Reconfiguration, a RACH process is performed. Thus, when the SCG is added, the NR subsystem may have a higher priority to use the best Tx antenna to complete the RACH process. In another example, when any measurement report (MR) is to be sent to the PCell (for both LTE and NR), the LTE subsystem may have a higher priority to use the best Tx antenna. In still another example, when a signaling radio bearer 3 (SRB3) is configured, the NR subsystem may have a higher priority for transmitting NSA reports. The SRB3 enables the SCG node to make intra-secondary cell handover decisions and execute a handover without involving the master node of the PCG.

It should be understood that the above listed priority data is only exemplary, and the priority of different data may be defined by the standards (e.g., 3GPP standards), the carrier, the UE manufacturer, etc.

A third factor for the UE to consider is whether aperiodic measurements are configured and, if so, whether the aperiodic measurements overlap for both RATs. The evaluations may be performed by the UE on a slot-to-slot basis. When aperiodic measurements are configured, the best antenna may be used by the subsystem (LTE or NR) transmitting the L1 measurements. When aperiodic measurements overlap for both RATs on ENDC, the RAT with the higher buffer status report (BSR) room may have the higher priority to send the L1 measurements.

Figure 3:
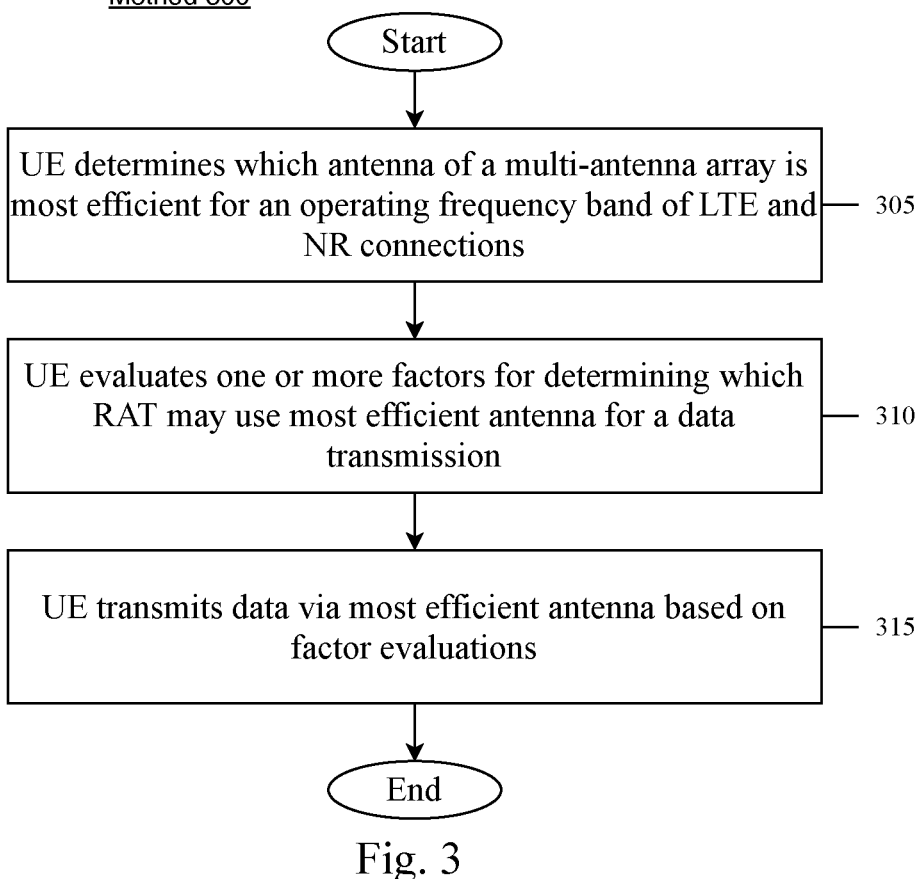
FIG. 3 shows a method for a user equipment (UE) in E-UTRA-NR Dual Connectivity (ENDC) operation to determine whether an antenna is to be used for LTE or NR transmissions.

FIG. 3 shows a method 300 for a user equipment (UE) in E-UTRA-NR Dual Connectivity (ENDC) operation to determine whether an antenna is to be used for LTE or NR transmissions. In 305, the UE determines which antenna of a multi-antenna array is most efficient for an operating frequency band of the LTE and NR connections. For example, as mentioned above, a particular antenna may have higher efficiency for low bands and marginal efficiency for middle and high bands.

In 310, the UE evaluates one or more factors for determining which RAT may use the most efficient antenna for a data transmission. For example, as mentioned above, a first factor includes whether the NR data split threshold is higher than the LTE data split threshold. A second factor includes whether high priority data is to be transmitted. A third factor includes whether aperiodic measurements are configured.

In 315, the UE transmits data via the most efficient antenna based on the factor evaluations. The evaluations are performed on a dynamic basis, so the most efficient antenna may be used for either LTE or NR transmissions at different times during the ENDC operation.

Smart Power Utilization

Power headroom relates to how much transmission power remains for a UE to use, in addition to the power being used by a current transmission, to remain within regulatory limits for transmission power, e.g. to meet specific absorption rate (SAR) requirements. For NR, the FCC defines a total maximum radiated power for a moving average of x seconds. For example, for LTE+NR (FR1), the UE cannot exceed a radiated power of Y dBm over a period of 100 seconds. In this 100 second period, the UE may transmit at a maximum Tx power (i.e. higher than an average value over the 100 seconds), but needs to reduce the Tx power below the average value over the 100 seconds to maintain a moving average to pass regulatory tests. If the user is holding a device, regulatory backoffs may be applied, limiting the overall Tx power of the device to 'x' dBm. This Tx power is a combined power of LTE/NR together. If the UE is power-limited on LTE then the following exemplary embodiments may be applied.

First, the UE may decide not to measure and report on the NR cell in the event that B1-NR measurements are configured. Second, higher backoffs and Tx blanking may be applied to a low priority RAT (NR) if any signaling is to be sent on the higher priority RAT (LTE). For example, a higher Tx backoff may be added to NR and provide better power headroom for LTE to transmit the higher priority signaling message.

Figure 4:
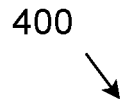
FIG. 4 shows an exemplary diagram for a prioritization of LTE/NR bearers.

Third, similar to the second exemplary embodiment, a higher backoff or Tx blanking may be applied to bearers with a lower priority. When the UE is configured with different traffic types, each traffic type being configured with different logical channel IDs, higher backoffs and/or Tx blanking is applied to a bearer with lower priority. FIG. 4 shows an exemplary diagram 400 for a prioritization of LTE/NR bearers. In the prioritization diagram 400, LTE-only signaling bearers and LTE-only voice bearers have the highest priority of "1."LTE-only default bearers and LTE+ NR split bearers have the second highest priority of "2," while NR-only bearers have the lowest priority of "3."

Fourth, for any periodic reports, the blanking may be done in a stochastic (random) manner. When the UE is approaching the transmission of a periodic measurement report (MR) or L1 periodic MR, the UE may start dedicated radio bearer (DRB) suppression just before the MR transmission so that the MR may be sent on max Tx power. For any critical aperiodic MRs, the UE may transmit the critical aperiodic report at max Tx power and compensate by blanking Tx data or establishing a higher backoff on upcoming grants to meet FCC/SAR max Tx power requirements.

Figure 5:
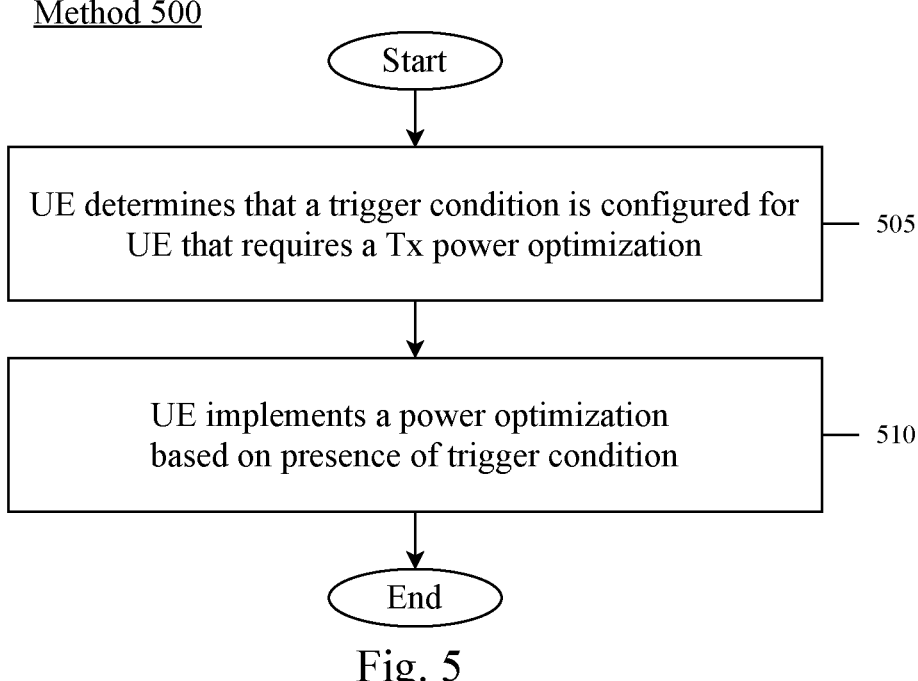
FIG. 5 shows a method for a user equipment (UE) in E-UTRA-NR Dual Connectivity (ENDC) operation to implement a transmit power optimization scheme to meet regulatory Tx power requirements.

FIG. 5 shows a method 500 for a user equipment (UE) in E-UTRA-NR Dual Connectivity (ENDC) operation to implement transmit power optimization scheme to meet regulatory Tx power requirements. In 505, the UE determines that a trigger condition is configured for the UE indicating that a Tx power optimization scheme should be implemented. For example, as discussed above, the trigger condition could be that B1-NR measurements are configured, or that a higher priority message is to be transmitted, or that a critical aperiodic report is to be transmitted.

In 510, the UE implements the power optimization scheme based on the presence of the trigger condition. For example, the Tx power may be shifted to the higher priority RAT, and a higher backoff and/or Tx blanking may be applied to the lower priority RAT or bearer. The power optimization scheme is configured so that an average Tx power over the time span (e.g. 100 seconds) provided in the regulatory requirement is met.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) having network connections for long-term evolution (LTE) and new radio (NR) radio access technologies (RATs) in non-standalone (NSA) E-UTRA-NR dual connectivity (ENDC) operation, wherein the processor is configured to perform operations comprising:

determining that a first trigger condition is present at the UE, wherein the first trigger condition is one of a plurality of trigger conditions that each require a transmit (Tx) power reduction for either one or both of the LTE connection and the NR connection, wherein the first trigger condition corresponds to a B1-NR measurement configuration;

implementing a first power optimization scheme based on the presence of the first trigger condition, wherein the first power optimization scheme includes suspending measurements and reporting on the NR RAT;

determining that a second trigger condition of the plurality of trigger conditions is present at the UE, wherein the second trigger condition corresponds to a plurality of bearer types each of which is configured with a different logical channel ID and a different priority, wherein a first bearer type of the plurality of traffic types is a LTE-only voice bearer and the LTE-only voice bearer has a first priority, a second bearer type of the plurality of traffic types is an LTE and NR split bearer and the LTE and NR split bearer has a second priority, and a third bearer type of the plurality of traffic types is an NR-only bearer and the NR-only bearer has a third priority; and implementing a second power optimization scheme based on the presence of the second trigger condition, wherein the second power optimization scheme includes implementing a higher power backoff and Tx blanking on the bearer type with a lowest priority.

2. The processor of claim 1, wherein a third trigger condition of the plurality of trigger conditions includes signaling to be sent via the LTE RAT and a third power optimization scheme for the third trigger condition includes implementing a higher power backoff and Tx blanking on the NR RAT.

3. The processor of claim 1, wherein a fourth trigger condition of the plurality of trigger conditions includes a presence of a lower priority bearer and a fourth power optimization scheme for the fourth trigger condition includes implementing a higher power backoff and Tx blanking on the lower priority bearer.

4. The processor of claim 1, wherein a fifth trigger condition of the plurality of trigger conditions includes the UE transmitting a periodic measurement report (MR) and a fifth power optimization scheme for the fifth trigger condition includes data radio bearer (DRB) suppression just prior to the MR transmission.

5. The processor of claim 1, wherein a sixth trigger condition of the plurality of trigger conditions includes the UE transmitting an aperiodic measurement report (MR) and a sixth power optimization scheme for the sixth trigger condition includes implementing a higher power backoff and Tx blanking on subsequently scheduled Tx data.

6. A user equipment (UE), comprising:

a transceiver configured to communicate with a long-term evolution (LTE) network and a new radio (NR) network using non-standalone (NSA) E-UTRA-NR dual connectivity (ENDC) operations; and a processor configured to:

determine that a first trigger condition is present at the UE, wherein the first trigger condition is one of a plurality of trigger conditions that each require a transmit (Tx) power reduction for either one or both of an LTE connection or an NR connection, wherein the first trigger condition corresponds to a B1-NR measurement configuration;

implement a first power optimization scheme based on the presence of the first trigger condition, wherein the first power optimization scheme includes suspending measurements and reporting on the NR RAT;

determine that a second trigger condition of the plurality of trigger conditions is present at the UE, wherein the second trigger condition corresponds to a plurality of bearer types each of which is configured with a different logical channel ID and a different priority, wherein a first bearer type of the plurality of traffic types is a LTE-only voice bearer and the LTE-only voice bearer has a first priority, a second bearer type of the plurality of traffic types is an LTE and NR split bearer and the LTE and NR split bearer has a second priority, and a third bearer type of the plurality of traffic types is an NR-only bearer and the NR-only bearer has a third priority; and implement a second power optimization scheme based on the presence of the second trigger condition, wherein the second power optimization scheme includes implementing a higher power backoff and Tx blanking on the bearer type with a lowest priority.

7. The UE of claim 6, wherein a third trigger condition of the plurality of trigger conditions includes signaling to be sent via the LTE network and a third power optimization scheme for the third trigger condition includes implementing a higher power backoff and Tx blanking on the NR network.

8. The UE of claim 6, wherein a fourth trigger condition of the plurality of trigger conditions includes a presence of a lower priority bearer and a fourth power optimization scheme for the fourth trigger condition includes implementing a higher power backoff and Tx blanking on the lower priority bearer.

9. The UE of claim 6, wherein a fifth trigger condition of the plurality of trigger conditions includes the UE transmitting a periodic measurement report (MR) and a fifth power optimization scheme for the fifth trigger condition includes data radio bearer (DRB) suppression just prior to the MR transmission.

10. The UE of claim 6, wherein a sixth trigger condition of the plurality of trigger conditions includes the UE transmitting an aperiodic measurement report (MR) and a sixth power optimization scheme for the sixth trigger condition includes implementing a higher power backoff and Tx blanking on subsequently scheduled Tx data.

11. A method performed by a user equipment (UE) having network connections for long-term evolution (LTE) and new radio (NR) radio access technologies (RATs) in non-standalone (NSA) E-UTRA-NR dual connectivity (ENDC) operation, the method comprising:

determining that a first trigger condition is present at the UE, wherein the first trigger condition is one of a plurality of trigger conditions that each require a transmit (Tx) power reduction for either one or both of the LTE connection and the NR connection, wherein the first trigger condition corresponds to a B1-NR measurement configuration; and implementing a first power optimization scheme based on the presence of the first trigger condition, wherein the first power optimization scheme includes suspending measurements and reporting on the NR RAT;

determining that a second trigger condition of the plurality of trigger conditions is present at the UE, wherein the second trigger condition corresponds to a plurality of bearer types each of which is configured with a different logical channel ID and a different priority, wherein a first bearer type of the plurality of traffic types is a LTE-only voice bearer and the LTE-only voice bearer has a first priority, a second bearer type of the plurality of traffic types is an LTE and NR split bearer and the LTE and NR split bearer has a second priority, and a third bearer type of the plurality of traffic types is an NR-only bearer and the NR-only bearer has a third priority; and implementing a second power optimization scheme based on the presence of the second trigger condition, wherein the second power optimization scheme includes implementing a higher power backoff and Tx blanking on the bearer type with a lowest priority.

12. The method of claim 11, wherein a third trigger condition of the plurality of trigger conditions includes signaling to be sent via the LTE RAT and a third power optimization scheme for the third trigger condition includes implementing a higher power backoff and Tx blanking on the NR RAT.

13. The method of claim 11, wherein a fourth trigger condition of the plurality of trigger conditions includes a presence of a lower priority bearer and a fourth power optimization scheme for the fourth trigger condition includes implementing a higher power backoff and Tx blanking on the lower priority bearer.

14. The method of claim 11, wherein a fifth trigger condition of the plurality of trigger conditions includes the UE transmitting a periodic measurement report (MR) and a fifth power optimization scheme for the fifth trigger condition includes data radio bearer (DRB) suppression just prior to the MR transmission.

15. The method of claim 11, wherein a sixth trigger condition of the plurality of trigger conditions includes the UE transmitting an aperiodic measurement report (MR) and a sixth power optimization scheme for the sixth trigger condition includes implementing a higher power backoff and Tx blanking on subsequently scheduled Tx data.

* * * * *